(12) United States Patent
Rauch (10) Patent No.: US 7,543,674 B2
(45) Date of Patent: Jun. 9, 2009

(54) STEERING LOCK OF A STEERING WHEEL ACTIVATING AN ANGLE OF INCLINATION OF AN ATTACHMENT

(75) Inventor: Hans Rauch, Bad Saulgau (DE)

(73) Assignee: Claas Saulgau GmbH, Bad Saulgau (DE)

( * ) Notice: Subject to any disclaimer, the term of this patent is extended or adjusted under 35 U.S.C. 154(b) by 123 days.

(21) Appl. No.: 11/451,964

(22) Filed: Jun. 13, 2006

(65) Prior Publication Data

US 2006/0277885 A1    Dec. 14, 2006

(30) Foreign Application Priority Data

Jun. 14, 2005    (DE) ..................... 10 2005 027 586

(51) Int. Cl.
*B62K 11/08* (2006.01)
(52) U.S. Cl. .................................... 180/235
(58) Field of Classification Search ............... 56/94, 56/15.8, 15.9, 83, 87, 97, 109, 14.9, 15.1, 56/15.5, 10.2 E, 209; 280/467, 503; 172/279, 172/3, 4.5; 701/200, 51, 50, 41, 213; 180/6.24, 180/415, 6.2, 242, 235, 204, 6.6, 240, 9.38, 180/12
See application file for complete search history.

(56) References Cited

U.S. PATENT DOCUMENTS

| | | | | |
|---|---|---|---|---|
| 2,821,059 A | * | 1/1958 | Heitshu | 56/209 |
| 2,980,443 A | * | 4/1961 | Fina, Jr. | 280/467 |
| 3,669,194 A | * | 6/1972 | Zurek | 172/280 |
| 3,982,384 A | * | 9/1976 | Rohweder et al. | 56/106 |
| 4,177,627 A | * | 12/1979 | Cicci | 56/15.8 |
| 4,266,395 A | * | 5/1981 | Basham | 56/209 |
| 4,522,020 A | * | 6/1985 | Anderson | 56/209 |
| 4,761,016 A | * | 8/1988 | Groud | 280/467 |
| 4,776,153 A | * | 10/1988 | DePauw et al. | 56/10.2 E |
| 5,238,077 A | * | 8/1993 | Vaughn et al. | 180/415 |
| 5,299,821 A | * | 4/1994 | Hurlburt | 280/503 |
| 5,359,836 A | * | 11/1994 | Zeuner et al. | 56/10.2 E |
| 5,415,586 A | * | 5/1995 | Hanson et al. | 460/8 |
| 5,918,448 A | * | 7/1999 | Wheeler | 56/10.4 |
| 5,970,695 A | * | 10/1999 | Dunn | 56/228 |
| 6,044,633 A | * | 4/2000 | Stiefvater et al. | 56/16.4 R |
| 6,076,342 A | * | 6/2000 | Loehr | 56/208 |
| 6,199,355 B1 | * | 3/2001 | Stiefvater et al. | 56/14.9 |
| 6,318,058 B1 | * | 11/2001 | Emmert | 56/14.6 |
| 6,434,462 B1 | * | 8/2002 | Bevly et al. | 701/50 |
| 6,481,192 B1 | * | 11/2002 | Harkcom et al. | 56/10.8 |
| 2002/0027025 A1 | * | 3/2002 | Kobayashi et al. | 180/6.2 |

(Continued)

FOREIGN PATENT DOCUMENTS

DE    102805    5/1899

(Continued)

*Primary Examiner*—Árpád Fábián-Kovács
(74) *Attorney, Agent, or Firm*—Burr & Brown (57) ABSTRACT

A method for operating an attachment for harvesting stalk-like crops mounted on a carrier vehicle including a plurality of working tools and at least one stalk-guiding element mounted upstream from the working tools, the method including a step of causing the at least one stalk-guiding element to pivot as a function of the location or position of at least one of the attachment and the carrier vehicle.

19 Claims, 8 Drawing Sheets

U.S. PATENT DOCUMENTS

2003/0208311 A1* 11/2003 McClure .................. 701/50
2006/0142936 A1*  6/2006 Dix ........................ 701/200
2007/0250236 A1* 10/2007 Newberry et al. ......... 701/51

FOREIGN PATENT DOCUMENTS

| | | | |
|---|---|---|---|
| DE | 4224887 A1 * | 9/1993 |
| DE | 196 39 805 A1 | 5/1997 |
| DE | 102 30 236 | 1/2004 |
| DE | 102 30 236 A1 | 1/2004 |
| EP | 1808063 A1 * | 7/2007 |
| FR | 2192443 | 2/1974 |

* cited by examiner

STEERING LOCK OF A STEERING WHEEL ACTIVATING AN ANGLE OF INCLINATION OF AN ATTACHMENT

This application claims the benefit under 37 CFR §119(a)-(d) of German Application No. 10 2005 027 586.9 filed Jun. 14, 2005, the entirety of which is incorporated herein by reference.

FIELD OF THE INVENTION

The invention relates to a method and a device for operating an attachment for harvesting stalk-like crops.

BACKGROUND OF THE INVENTION

In conjunction with field choppers and their attachments, cutting and conveying devices for cutting stalk-like stem crops, such as, for example, corn, with cutting and conveying tools revolving about upright axes are known.

Exemplary embodiments of a revolvingly driven cutting and conveying system of attachments for harvesting stalk-like crops are known, for example, from DE 102 805 and DE 102 30 236. These types of attachments are held on the front side of field choppers, cut off the stalk-like plants close to the ground, convey them into the draw-in shaft of the chopper.

The cutting and conveying device described in DE 196 39 805 and DE 102 30 236 includes cutting and conveying rotors which are mounted next to one another transversely with respect to the direction of travel in a framework, and the conveying rotors of which have indentations which receive the cut-off stalks and retain them over a section of the revolving path and release them again in the rear region so that they can be passed on to the draw-in gap of the chopper.

A cutting and conveying rotor comprises a cutting disk situated at the bottom and, situated above it on a common drive shaft, two conveying disks which are situated at a distance from each other and have indentations situated one above another. To assist the transfer of the cut-off corn stalks to the conveying disks of the conveying drums, stalk lifters with stalk-guiding elements which push the corn stalks into the indentations are mounted upstream of the cutting and conveying rotors.

With increasing working widths of the attachments, the situation arises when cornering that, in the event of relatively constricted turning radii when there is a change in the direction in the working mode, the stalk lifters, guiding fingers and stem dividers are no longer oriented perpendicularly to the turning radius. As a result, when they come into contact with the plants which are still upright, they cause the stalks thereof to bend over by displacing them transversely, with the consequence that the stalk is cut off obliquely in an inclined position and the length of the stubble is thereby increased, which causes losses in the harvested crop. If this is to be avoided, a laborious turning maneuver is required, generally associated with dragging or traveling forward and backward. The present invention has set itself the object of avoiding this. Identical problems occur when working on sloping terrain if slope drift arises, and the carrier vehicle positions itself obliquely with respect to the direction of travel as a consequence of the drift forces. Even in this case, the stalk-guiding elements, which are mounted upstream of the working tools and are situated obliquely with respect to the direction of travel, tend to bend the plant stalks out of the upright position which then results in relatively long stubble lengths.

SUMMARY OF THE INVENTION

The object of the present invention is therefore to propose a method and a device for operating an attachment having large working widths for harvesting stalk-like crops so that, even when cornering with large working widths, a uniform stubble length is obtained without causing interruption to the harvesting process. In addition, the present invention is equally suitable for drift compensation when harvesting on a slope so that uniform stubble lengths are likewise obtained therewith as on flat terrain. The present invention is thus intended to deal with both cases of use, the shortcomings of which are identical in cause, by combining solutions for both cases of use.

According to the present invention, the object is achieved by the corresponding stalk-guiding elements, such as stalk lifters, guiding fingers and dividers, being automatically correspondingly readjusted with regard to their orientation with respect to the turning radius during cornering. The advantage of the present invention resides in the fact that the stalk-guiding elements, on the radius vector assigned to them, of the respective turning radius are oriented approximately or virtually perpendicularly thereto, which means that they are oriented approximately tangentially to the circumscribed circle on which the stalk-guiding elements move. The pushing transverse offset exerted on the stalks by the stalk-guiding elements mounted upstream of the cutting disks in the direction of travel as a consequence of swinging out is therefore either completely avoided, or is at least virtually, and therefore, acceptably suppressed.

These orientation changes of the stalk-guiding elements are pivoting movements that take place relative to the carrier vehicle about one or more upright axes of rotation. These pivoting movements are defined by the pivot angle about precisely this pivot axis. The magnitude of the pivoting movement is indicated by the angle of inclination, and it is dependent on the amount of the turning radius being passed through at a particular instant. As an alternative, the angle of inclination may also be derived directly from the steering angle of the steering of the carrier vehicle.

In the ideal case, each of the stalk-guiding elements can be pivoted separately and independently of another, in each case about its own upright pivot axis, but it is also possible for the entire attachment to be able to be pivoted relative to the carrier vehicle, so that all of the stalk-guiding elements of an attachment are pivoted about a common upright pivot axis. If the latter is the case, this is an averaged correction of the angle of inclination which, in practice, supplies sufficiently good results. However, according to the present invention, it is also possible to bring about the angle of inclination or the angles of inclination of a guiding element by means of a combination of pivoting movements such that, firstly, the entire attachment is pivoted by a partial angle of inclination relative to the carrier vehicle and, secondly, the stalk-guiding elements are pivoted individually or in groups by a further partial angle of inclination. One group of stalk-guiding fingers, as stalk-guiding elements, may be arranged, for example, on a common base of a single cutting and conveying rotor, with the result that the base can be pivoted together with the guiding elements. The sum total of both partial angles of inclination in turn produces the angle of inclination of the respective stalk-guiding element during the particular cornering operation.

The angle of inclination itself is determined from the angle of lock of the steering wheels of the carrier vehicle, as is well known to the person skilled in the art, for example, from the technical teaching of automatic steering systems of carrier vehicles in the case of field choppers or combine harvesters. The value of this angle of lock is supplied to a microprocessor as an input signal from which the angle of inclination or the angles of inclination of the stalk-guiding elements is/are then calculated and supplied as a corresponding output signal to one or more actuators, which then cause the pivoting operation of the stalk-guiding elements by a corresponding angle of inclination. An actuator may be, for example, a hydraulically or an electrically actuated pivoting drive and, in a particularly advantageous manner, a hydraulic cylinder.

In this case, it may be advantageous if at least one actuator is likewise equipped with a sensor which supplies conclusions concerning the state of the angle of inclination of the stalk-guiding elements, where this value is also supplied to a microprocessor as an input signal. The adjustment of the angle of inclination or angles of inclination of the stalk-guiding elements can therefore be actively assigned to the automatic steering system of the carrier vehicle in the sense of a control circuit.

In the subsequent straight-ahead travel, the pivoting operation of the stalk-guiding elements is therefore neutralized again, i.e., the angles of inclination are again returned to the value zero.

The particular advantage of the present invention therefore resides in the fact that at least one stalk-guiding element, as directing element, can be pivoted relative to the carrier vehicle as a function of the location or the position of the attachment. Therefore, at least one stalk-guiding element of the attachment can execute a relative rotation about a center of motion within the context of a rotation or pivoting by the amount of an angle of inclination as a consequence of a change in direction of travel of the attachment and/or of the carrier vehicle. In this case, however, the entire attachment or parts of the attachment may also participate in the pivoting.

BRIEF DESCRIPTION OF THE DRAWINGS

The present invention is explained in more detail below with reference to various exemplary embodiments.

FIG. 3b is an enlarged detail of FIG. 3a.

DETAILED DESCRIPTION OF THE INVENTION

Figure 1:
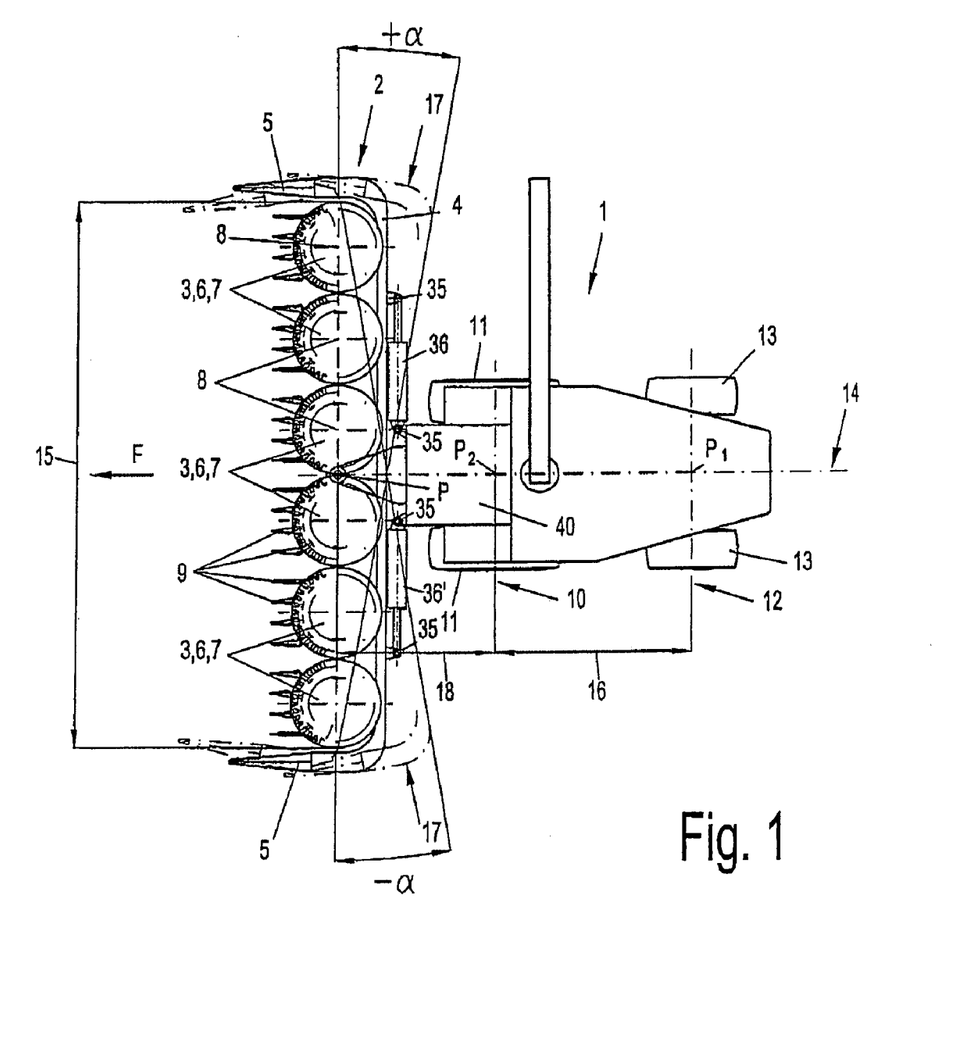
FIG. 1 is a top plan view of a self-propelled harvesting machine according to the present invention.

FIG. 1 shows a self-propelled harvesting machine according to the present invention in a top plan view, including a carrier vehicle 1, realized as a field chopper with an attachment 2 (corn picker head) which is known for harvesting entire corn plants which, after cutting and further transportation, are supplied to the draw-in gap and are drawn in by the draw-in rollers and are therefore supplied to the chopping drum. The attachment comprises a machine frame 4 with the cutting and conveying rotors 3 which are driven in a revolving manner about upright axis of rotation 8 and have cutter and conveying disks 6, 7 which are arranged coaxially with the axis of rotation 8 and are situated one above the other and are mounted in the machine frame 4. The attachment is outwardly bounded by dividers 5 which are situated partly upstream from and partly next to the outer cutting and conveying rotors, and which at the same time delimit the cutting and working width 15 situated in between. Mounted upstream of the individual cutting and conveying rotors 3 are guiding fingers 9 which direct the plant stalks to be cut off into the conveying pockets of the conveying disks and push the plant stalks into them. The dividers 5 and the guiding fingers 9 therefore function as stalk-guiding elements. Guiding elements of this type also include, for example, a down crops auger or divider tips, for example on picking attachments.

Carrier vehicles 1 of this self-propelled type, as illustrated in this example, generally have a rigid front axle 10, the front wheels 11 of which are driven, and a steerable rear axle 12 situated at the center distance 16 behind the front axle 10 and having steerable rear wheels 13. The driver's stand of the carrier vehicle is accommodated in the driver's cabin 40.

In this case, the attachment 2 is coupled to the carrier vehicle 1 in such a manner that, during cornering, it can execute pivoting movements by an angle of inclination +α or −α relative to the carrier vehicle or relative to the vertical longitudinal center plane 14 about a center of motion P, this being indicated by contour lines 17 of the pivoted attachment 2. In this case, the center of motion P is situated at a distance 18 in front of the front axle 10.

The attachment is illustrated in FIG. 1 in straight-ahead travel with the direction of travel F. The rear axle 12 intersects the vertical longitudinal center plane 14 of the carrier vehicle 1 at the point $P_1$ and the front axle 10 intersects the vertical longitudinal center plane of the carrier vehicle at the point $P_2$.

Figure 2:
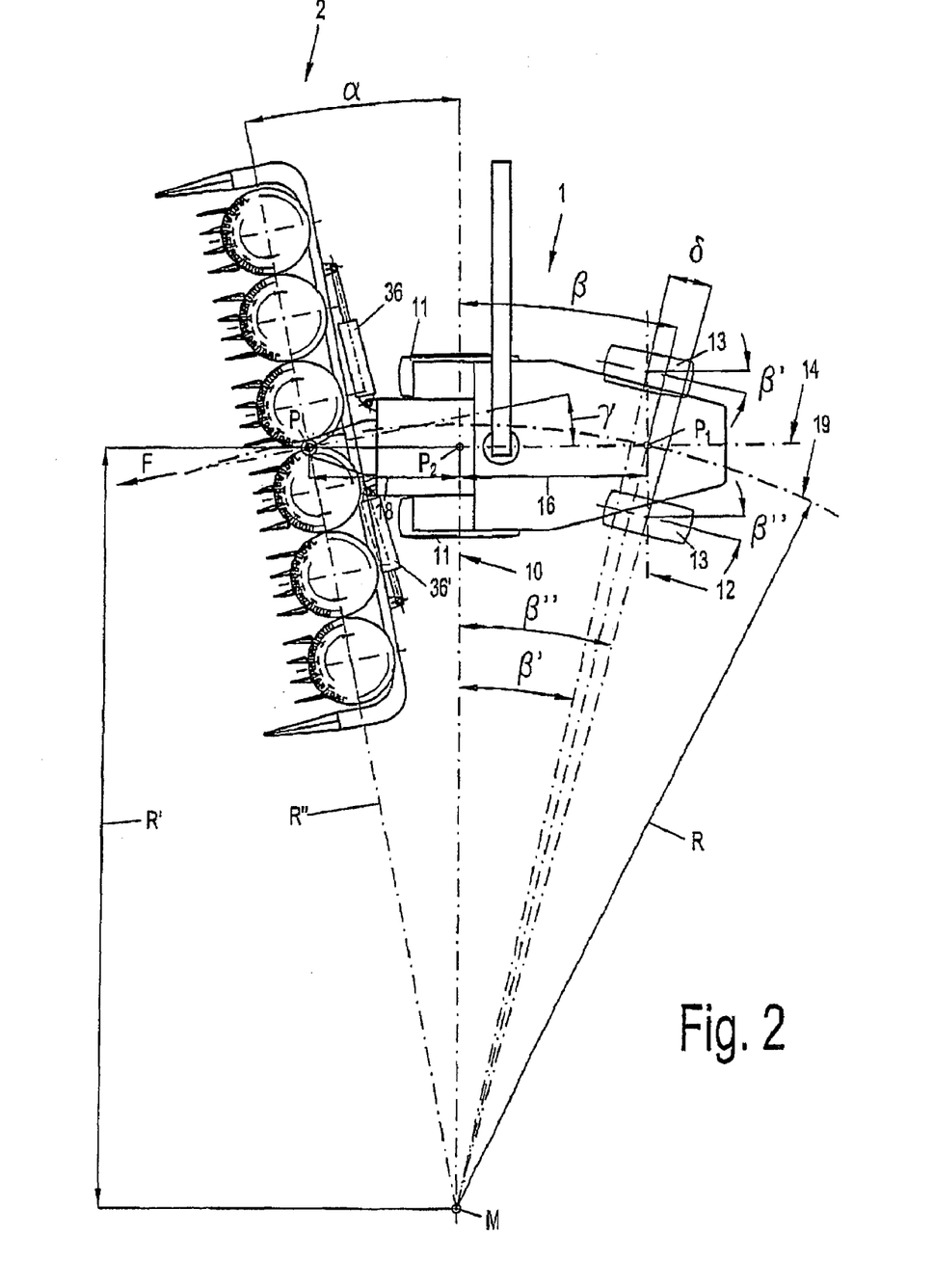
FIG. 2 is a top plan view of a harvesting implement as a self-propelled unit comprising a carrier vehicle and attachment.

FIG. 2 shows the harvesting implement as a self-propelled unit, comprising the carrier vehicle 1 and the attachment 2, during cornering with locked rear wheels 13 as the steering wheels. In principle, however, the front wheels or alternatively also both axles, i.e., both rear and front wheels, may also be steerable.

The cornering, such as the left-hand cornering illustrated in FIG. 2, causes the carrier vehicle 1 to move about the instantaneous center of rotation M with the turning radius R. The attachment 2 therefore also moves about the instantaneous center of rotation M with the turning radius R.

In order to compensate for the inclination of the stalk-guiding elements, dividers 5 and guiding fingers 9 due to the attachment 2 swinging out with respect to the direction of travel F, and in order to avoid the undesired transverse push against the plant stalks, the attachment 2 is pivoted about an upright axis of rotation, which runs through the center of motion P, by the angle of inclination α in relation to its starting position in straight-ahead travel. As a result, the longitudinal extent of the stalk-guiding elements, dividers 5 and guiding fingers 9 is now oriented with respect to the direction of travel F, by the pivoting operation with the angle of inclination α, approximately perpendicularly to the radius R″ which runs from the instantaneous center of rotation M through the center of motion P.

The required angle of inclination α can be derived from the wheel locks with the angles of lock β', β″ which are detected metrologically by angle sensors of the carrier vehicle 1, with the angles of lock taking up a difference in angle δ with respect to each other that is caused by the turning radii on which the rear wheels 13 run differing in size. The arithmetic mean of β' and β″ produces the angle β enclosed by the front axle 10 and the radius of the instantaneous center of rotation R which intersects point P1. The origin of the radius of the instantaneous center of rotation R is the instantaneous center of rotation M, with the radius vector R about the instantaneous center of rotation M describing a circular arc 19 which intersects the rear axle 12 and the vertical longitudinal center plane 14 at the point $P_1$. The instantaneous center of rotation M is situated in this case approximately on the extension of the front axle 10.

Since the instantaneous center of rotation M is therefore situated with sufficient proximity on the front axle 10, and the location of the instantaneous center of rotation P at a particular instant is therefore calculated with sufficient proximity, taking the right-angled triangle with the triangle points M, P1, P2 as the basis, together with the now known angle β and the center distance 16 as follows, by the radius vector R calculated according to the relationship:

sin β=center distance 16/radius of the instantaneous center of rotation R;

or radius of the instantaneous center of rotation R=center distance 16/sin β;

and therefore:

cos β=R'/R;

or and therefore:

R'=R·cos β.

With the constructively defined distance 18 of the center of motion P from the front axle 10, the required angle of inclination α can be calculated as follows:

tan α=distance 18/R'; and

α=arctan(distance 18/R').

The center of motion P therefore undergoes a change in the travel direction in relation to the straight-ahead travel by the direction of travel angle γ, which in terms of magnitude is approximately and sufficiently identical to the angle of lock α.

Depending on the quadrant in which the angles of lock β', β'' are situated, the angle α assumes a positive or negative value.

It follows from this that the angle of inclination α disappears to zero if the distance 18 likewise disappears to zero, but this is not possible for cost reasons. It has therefore proven particularly favorable to dimension the distance 18 of the center of motion such that it lies within the range of 500 to 2500, preferably approximately around 1500. The center of motion P is not necessarily bound to a fixed, physical axis and may arise from a virtual axis, for example resulting from a coupling mechanism, if the attachment 2 is connected to the carrier vehicle 1 by means of coupling links. In this case, the center of motion P may also be situated upstream or downstream of the attachment 2 in the direction of travel F.

Figure 3A:
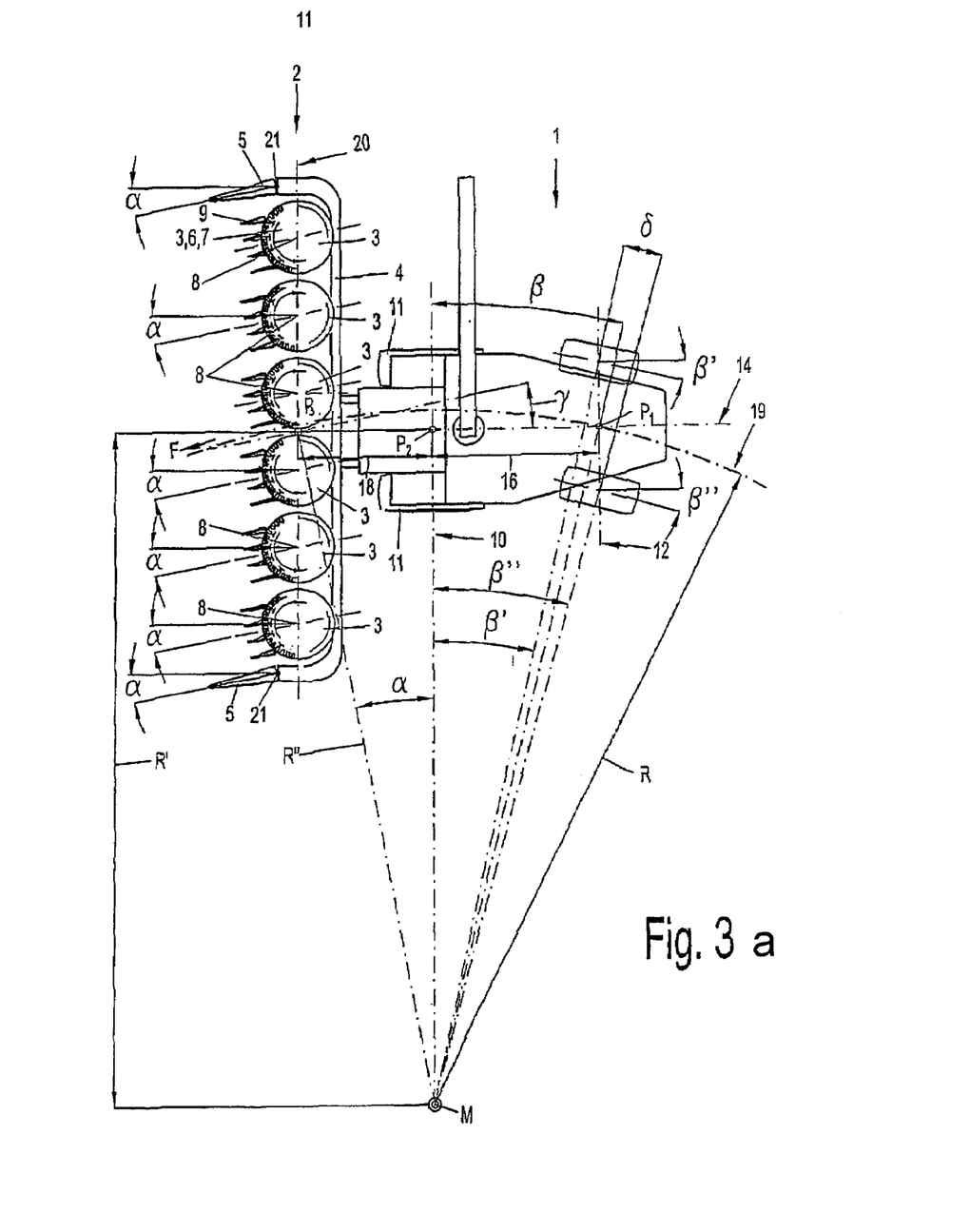
FIG. 3a is another embodiment according to the present invention.

FIG. 3a shows another embodiment according to the invention. In contrast to the embodiment according to FIG. 2, the entire attachment 2 is not pivoted about a common center of motion P relative to the vertical longitudinal center plane 14 during cornering. Instead, only the individual stalk-guiding elements, guiding fingers 9 and dividers 5 are pivoted relative to the carrier vehicle 1 about a respectively dedicated center of motion assigned to them. Analogously to FIG. 2, the center of motion P in FIG. 3a is defined as a virtual pivot point P3 which is likewise situated at the distance 18 in front of the front axle 10 and is preferably situated on the vertical longitudinal center plane 14. The point $P_3$ is defined by the intersecting point of the connecting straight line 20, on which the axes of rotation 8 of the cutting and conveying rotors 3 are situated, with the vertical longitudinal center planes 14.

Analogously to the description of the figures according to FIG. 2, the triangle with the triangle points M, P2, and P3 now determines the average angle of inclination α about which only the stalk-guiding elements, dividers 5 and guiding fingers 9 are pivoted. The guiding fingers 5, which are assigned to a cutting and conveying rotor 3, are fastened, for example, to a slewing ring which is mounted below the respective cutting and conveying rotors 3 such that it can rotate about the respective axis of rotation 8, and which can then be pivoted by the angle of inclination +α, −α by means of a suitable actuating drive. The dividers 5 may also be rotated by the angle of inclination +α, −α about an upright hinge axis 21 by means of suitable actuating drives (not illustrated). The respective center of motion about which the guiding fingers 9 of a group of a cutting and conveying rotor 3 are pivoted is, in this exemplary embodiment, particularly advantageously the axis of rotation 8 of a cutting and conveying unit 3.

Figure 3B:
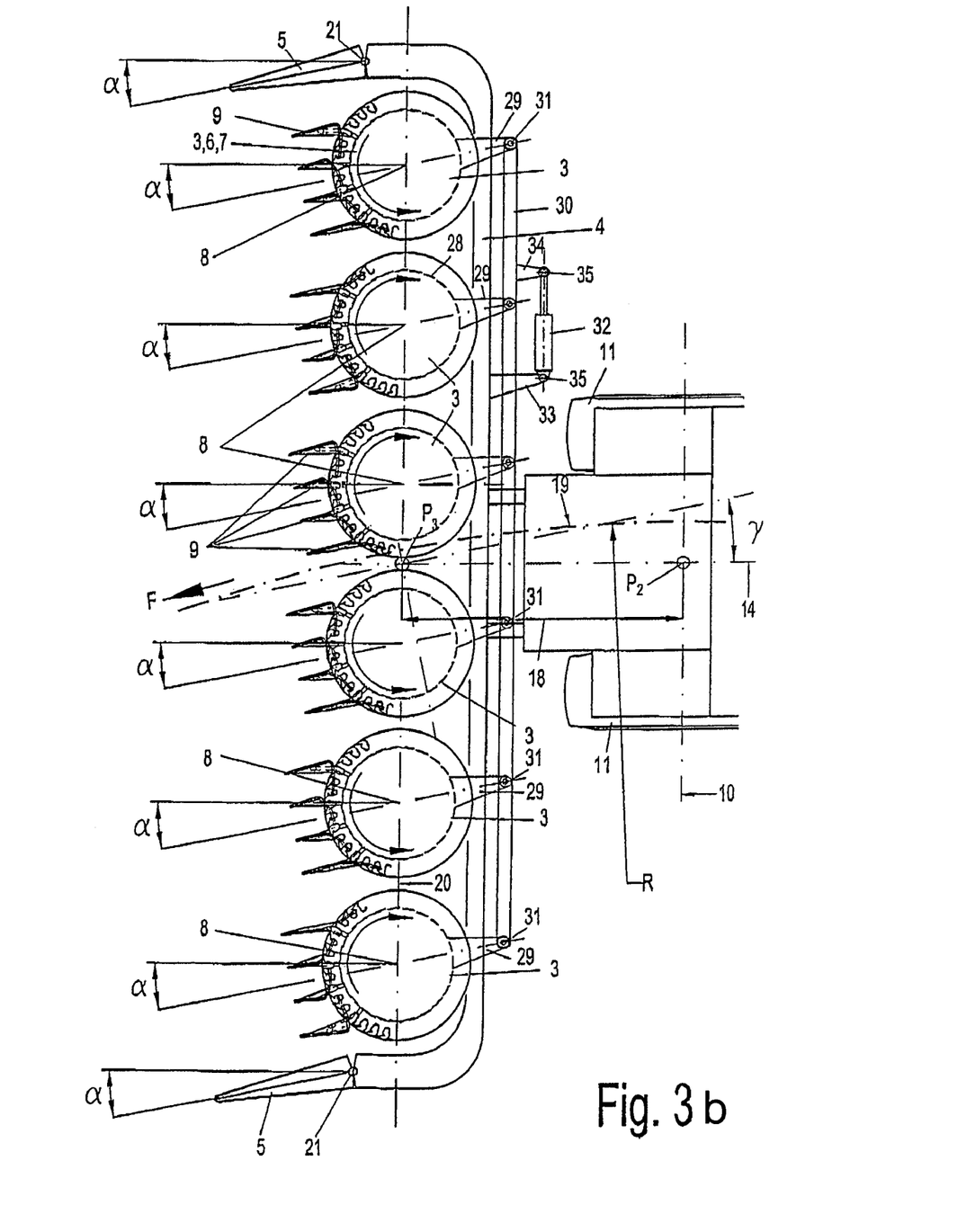

FIG. 3b shows an enlarged detail from FIG. 3a and, in addition, a coupling mechanism (illustrated in simplified form) for adjusting the direction of the guiding fingers 9 by the angle of inclination α. The guiding fingers 9 are fastened to a slewing ring 28 which is mounted below the cutting and conveying disks 3. Fastened to the slewing ring 28 is a lever 29 which points radially outward and at the end of which is situated a point of articulation 31. All of the points of articulation 31 are connected to a push rod 30. The push rod 30 can be actuated by a hydraulic cylinder as actuating drive 32, with the actuating drive 32 being clamped in the points of articulation 35 and being supported, on the one hand, on the machine frame 4 at the bracket 33 and, on the other hand, on the lever 34 of the push rod 30. The actuating drive 32 may be coupled, for example, to a displacement transducer as angle of inclination sensor which imparts its location at a particular instant to a microprocessor onboard the carrier vehicle in the form of an input signal. In this case, the microprocessor can pass on an output signal, in the sense of a control circuit, to an actuator which controls the actuating drive 32 in such a manner that the angle of inclination α calculated at the particular instant is set at the stalk-guiding elements 9, 5. In the exemplary embodiment illustrated, the four guiding fingers 9 of a cutting and conveying rotor 3 form a group of guiding fingers which, together with the slewing ring 28, form a unit, so that they participate together in a pivoting operation with the angle of inclination α. In principle, the pivoting operation of the dividers 5 may also be connected to the coupling mechanism, with it also being entirely possible, on the other hand, for said coupling mechanism to be assigned to a separate actuating drive.

Figure 4:
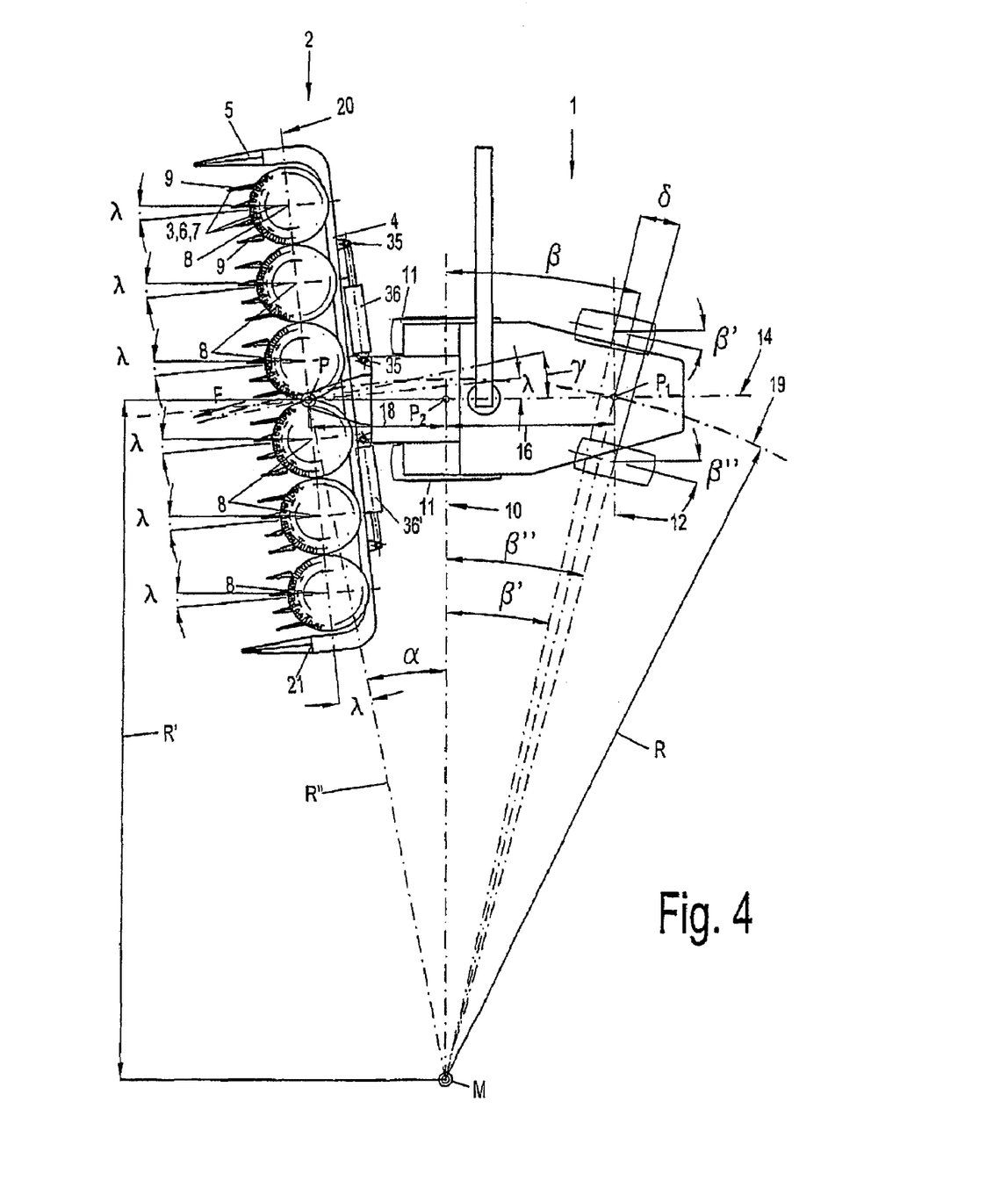
FIG. 4 is another embodiment according to the present invention.

FIG. 4 shows another embodiment according to the present invention. In this case, it is essentially a combination of the features of the exemplary embodiments according to FIG. 2 and FIGS. 3a and 3b. In this exemplary embodiment, the attachment 2 is merely pivoted about part of the pivot angle α, namely by an angle of inclination λ, relative to the carrier vehicle 1, with the stalk-guiding elements. In particular, in this use example, the guiding fingers 9 are likewise pivoted by the angle of inclination λ relative to the machine frame 4. In a particularly advantageous manner, half of the amount of the angle of inclination α is assigned to the angle of inclination λ. In this method of controlling the cornering, it can be regarded as particularly advantageous that the pivot angles λ bisect that of the attachment 2 about the center of motion P, and of the guiding fingers 9 about the axis of rotation 8. It is even possible to omit the pivoting of the dividers because the orientation error of the dividers 5 can then be negligibly small in practice.

Figure 5A:
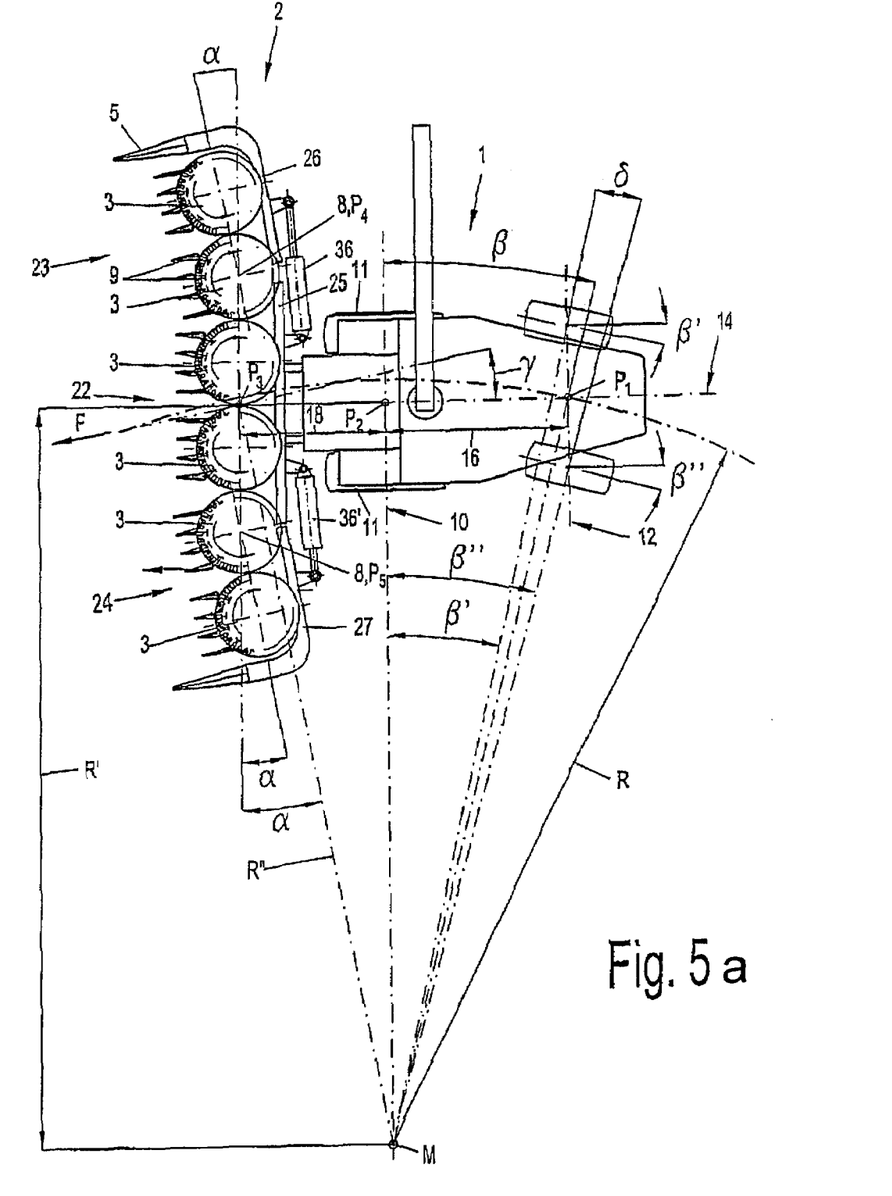
FIGS. 5a and 5b are further embodiments according to the present invention.
Figure 5B:
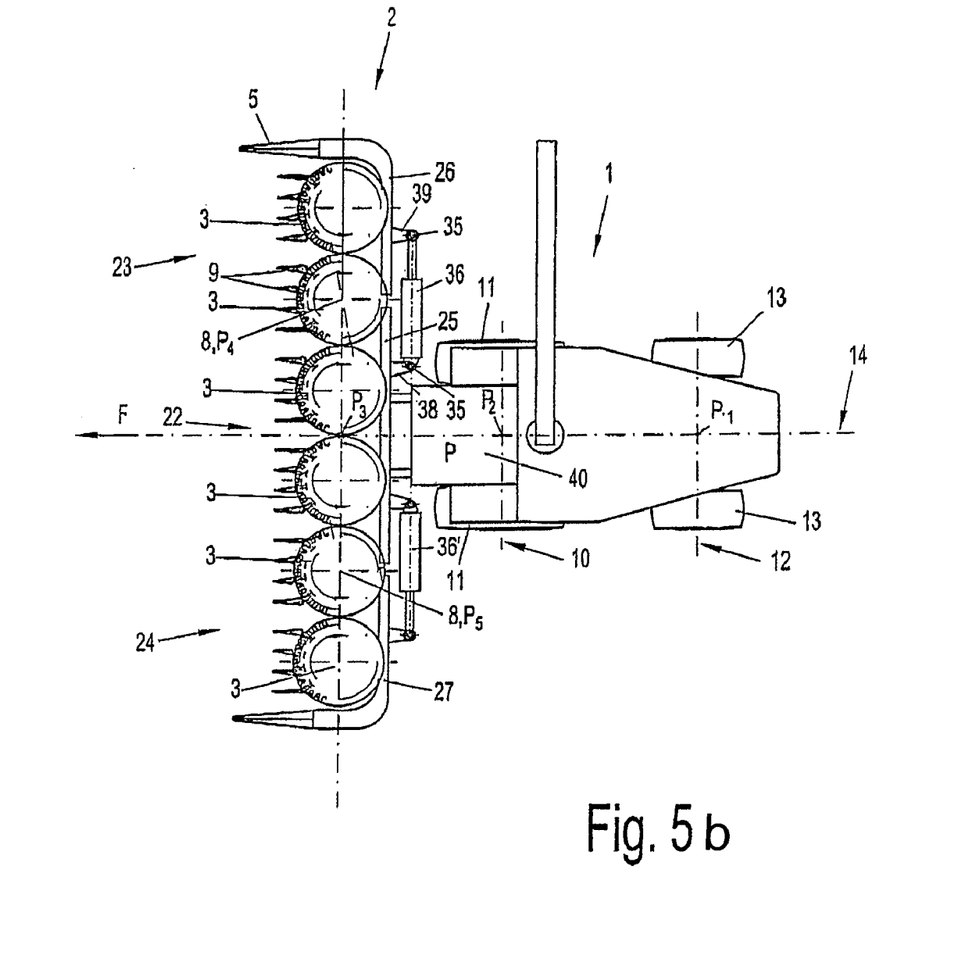

FIG. 5a and FIG. 5b show yet another embodiment according to the present invention. In this exemplary embodiment, the central part 22 of the attachment 2 is coupled virtually rigidly to the carrier vehicle, i.e., is not pivotably coupled about an upright axis thereto, and as a result, the pivoting of the guiding fingers 9 of the cutting and conveying disks 3 of the central part is likewise unnecessary. Instead, during cornering, only the outer sections 23, 24 of the attachment 2 are pivoted through the angle of inclination α. For this purpose, it is necessary also to divide the machine frame 4 into a central part 25 and two further outer parts 26, 27 in which the associated cutting and conveying rotors 3 are then mounted such that they are driven in a revolving manner. During cornering, the outer sections 23, 24 of the attachment are pivoted about the centers of motion P3 and P4, respectively, by the angle of inclination α which can be determined and calculated in accordance with the criteria set out previously.

In an advantageous manner, the centers of motion P3 and P4 of the outer sections 23, 24 of the attachment are identical to the axes of rotation 8 of the cutting and conveying disks 3 situated on the outside in the central part 22 of the attachment 2. At the same time that the sections 23, 24 of the attachment 2 and of the outer parts 26, 27 of the machine frame 4 pivot about the centers of motion P4, P5, the stalk-guiding elements, guiding fingers 9 and dividers 5 pivot by the angle of inclination α. In straight-ahead travel, as illustrated in FIG. 5b, the sections 23, 24 pivot back into their basic position, so that the amount of the angle α disappears to zero. The inventive solution according to FIG. 5a and FIG. 5b is particularly advantageous because, in comparison to known attachments, the central part 22 of the attachment does not require any constructive changes whatsoever, as far as the configuration of the transfer of the corn plants to the draw-in gap of the draw-in housing of the carrier vehicle 1 is concerned. Also the actuating drives 36, 36' as pivoting drives for precisely pivoting the two outer sections 23, 24 by the angle of inclination α during cornering, can be realized in a particularly simple manner by means of hydraulic cylinders with identical movement control, so that the two outer sections 23, 24 of the attachment 2 inevitably pivot by the same amount as the angle of inclination α. In this case, the actuating drives 36, 36' are fastened, firstly, in the point of articulation 35 of the bracket 38 on the machine frame central part 25 and, secondly, in the point of articulation 35 of the lever 39 on the respective pivotable part of the machine frame as outer part 26, 27.

Figure 6:
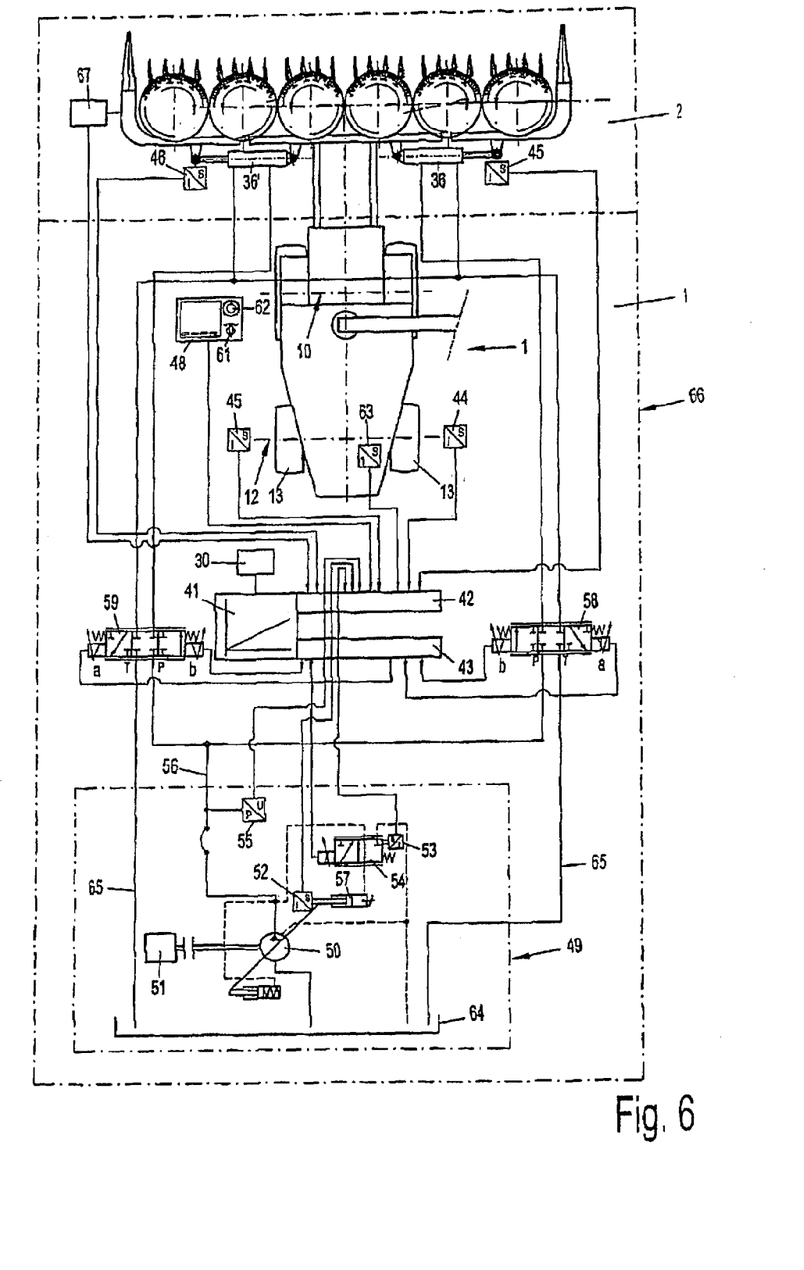
FIG. 6 illustrates the cornering control principle with respect to the embodiment shown in FIGS. 5a and 5b.

FIG. 6 shows, with reference to the exemplary embodiment according to FIG. 5a and FIG. 5b, the principle of cornering control according to the present invention for activating the actuating drives for pivoting the stalk-guiding elements of an attachment 2 according to the invention.

The driver's control stand of the carrier vehicle 1 is situated in the driver's cabin 40. Situated in the driver's cabin 40 is a terminal 48 with a function selection switch 61 with which the control can be preset to automatic control or to manual control.

In the automatic mode, the angles of lock β' and β'' are detected by the angle of lock sensors 44 and 45 and supplied as input signals to the input 42 of the microprocessor 41. At the same time, the input signals of the angle of inclination sensors 45 and 46, which detect the actual state of the angles of inclination α, are likewise applied to the input 42 of the microprocessor 41. The software for operating the microprocessor control for controlling the cornering of the attachment is deposited in a RAM memory 60. For the transmission of the control signals, a databus, for example an ISO bus, is provided. The actuating drives 36, 36', realized as identical movement cylinders, are activated by the proportional directional control valves 58, 59.

The hydraulic unit 49 is situated onboard the carrier vehicle 1 and, on the drive side, is operatively connected to the internal combustion engine of the carrier vehicle 1 as the driving motor 51. To minimize losses of power, on the one hand, and in particular for the purpose of providing highly dynamic cornering control on the other hand, the hydraulic pump 50 is designed as a load-sensing pump to be controlled both in terms of pressure and in terms of delivery flow.

The hydraulic pump 50 is controlled via a control valve 54 based on the data recorded by a pressure sensor 55, by a delivery flow sensor 53 and a pivot angle sensor 52, and also as a function of the driving speed of the carrier vehicle 1, which is detected by the speed of rotation sensor 63, and by the angular acceleration of the adjustment speed of the angles of lock β' β'', which is detected by the angle of lock sensors 44, 45. These signals are applied to the input 42 of the microprocessor 41 as input signals. On the basis of these input signals, the microprocessor 1 determines the delivery flow required at a particular instant and the required hydrostatic pressure which the hydraulic pump has to provide for the hydraulic system so that the control operation can follow the dynamics of the cornering control.

A signal for activating the control valve 54 is therefore present at the output 42 of the microprocessor, and the control valve in turn actuates the actuating drive 57 of the hydraulic pump 50 as the actuator.

The pressure line 56 leads to the 4/3-way directional control valves 58, 59 which act on the actuating cylinders 36, 36' on the pressure side based on the angles of lock β' β'' that are detected metrologically by the angle of lock sensors 44, 45. In the event of the actuating cylinders 36, 36' being actuated, only one of the two actuating cylinders 36 or 36' is acted upon on the pressure side by only one of the two 4/3-way directional control valves 58 or 59 being activated on the b-side, while the other one of the directional control valves 58 or 59 is activated at the same time on the a-side. The respectively displaced oil column of the activated actuating cylinder 36 or 36' acts on the other actuating cylinder 36 or 36' at the same time. As a consequence, if the piston rod of the one actuating cylinder, for example of the actuating cylinder 36, is pressurized by the directional control valve 58, it extends out of the cylinder housing, whereas the piston rod of the corresponding actuating cylinder 36' retracts into the cylinder housing thereof. The displaced oil column of the actuating cylinder 36' can then flow back via the directional control valve 59 that is activated on the a-side and return via the tank return line 65 into the oil tank 64 of the hydraulic unit 49.

The logic operations of this control operation are part of the software deposited in the RAM memory, with the logic evaluation and the issuing of orders being undertaken by the microprocessor 41. This also includes the evaluation of the control logic, based on the +/− sign of the supplied data situation of the angle of lock sensors 44, 45 at the input 42, which decide whether it is a left-hand or a right-hand turn and which activates the corresponding control logic. This also decides whether the directional control valve 58 is activated on the b-side, which corresponds to a left-hand turn, and, in consequence, the directional control valve 59 is activated on the a-side, or whether the directional control valve 59 is activated on the b-side and the directional control valve 58 is activated on the a-side, which corresponds to a right-hand turn.

In straight-ahead travel, the two piston rods of the actuating drives 36, 36' are in the central position, with the 4/3-way directional control valves 58, 59 also remaining in the central position as the locking position. A leakage oil compensation (not illustrated specifically) with a central position zero balance is also required in this connection, so that the actuating cylinders 36, 36' cannot lose their central positions due to leakage oil losses at the seals of the piston rods during straight-ahead travel.

The position of the piston rods of the actuating drives 36, 36' at a particular instant is detected metrologically by the angle of lock sensors 45, 46 and the signals are supplied to the input of the microprocessor. The control of the attachment within the context of the orientation of the stalk-guiding elements, such as guiding fingers 9 and dividers 5 etc., is therefore based on an automatic microprocessor 41 controlled control circuit.

As an alternative, however, the present invention also provides a manual control mode which can be preselected by the function selection switch 61. For example, a rotary potentiometer 62 can then be used to preselect an angle of inclination $+/-\alpha$ which is then kept constant independently of a turn or straight-ahead travel. This is particularly an advantage on sloping terrain in order to compensate for the slope drift of the entire harvesting machine, comprising carrier vehicle 1 and attachment 2. The stalk-guiding elements can therefore then be set on the correct course by a correspondingly set angle of inclination $+/-\alpha$.

The control components of the previously described steering control can be entirely accommodated, or only partially accommodated, onboard the carrier vehicle 1, but may also be part of the attachment 2. It is also entirely possible for a job computer to be part of the attachment 2 and for it to also be part of the steering control components, where the computer transmits its data to a microprocessor 41 of the carrier vehicle via a bus system and also receives data from the microprocessor. It is also possible for both to communicate with each other in terms of information. The bus system may be, for example, an ISO databus.

The exemplary embodiments illustrated relate to the combination of field chopper as carrier vehicle 1 and attachment 2 as corn head picker. However, the present invention can also be used analogously in conjunction with other attachments, such as, for example, corn pickers and also in conjunction with other carrier vehicles 1, such as, for example, also combine harvesters.

Stalk-guiding elements of this type can therefore be guiding fingers 9, dividers 5, a down crops auger or divider tips.

LIST OF DESIGNATIONS

1 Carrier vehicle (field chopper)
2 Attachment
3 Cutting and conveying rotor
4 Machine frame
5 Divider, working width limiter or guiding element
6 Cutter disk
7 Conveying disk
8 Axis of rotation
9 Guiding finger or guiding element
10 Front axle
11 Front wheels
12 Rear axle (steering wheels)
13 Rear wheels
14 Vertical longitudinal center plane
15 Cutting and working width
16 Center distance
17 Contour line
18 Distance
19 Circular arc (curved arc)
20 Connecting line
21 Upright hinge axis
22 Attachment central part
23 Attachment outer section
24 Attachment outer section
25 Machine frame central part
26 Machine frame outer part
27 Machine frame outer part
28 Base (slewing ring)
29 Lever
30 Push rod
31 Point of articulation
32 Actuating drive (hydraulic cylinder)
33 Bracket
34 Lever
35 Point of articulation
36, 36' Actuating drive (hydraulic cylinder)
37 Point of articulation
38 Bracket
39 Lever
40 Driver's cabin
41 Microprocessor
42 Inputs microprocessor
43 Outputs microprocessor
44 Angle of lock sensor
45 Angle of lock sensor
46 Angle of inclination sensor
47 Angle of inclination sensor
48 Terminal
49 Hydraulic unit
50 Hydraulic pump
51 Driving motor
52 Pivot angle sensor
53 Delivery flow sensor
54 Control valve
55 Pressure sensor
56 Pressure line
57 Actuating drive
58 Directional control valve
59 Directional control valve
60 RAM memory
61 Function selection switch
62 Rotary potentiometer
63 Speed of rotation sensor
64 Oil tank
65 Tank return
66 Control device
67 Job computer
F Direction of travel
M Instantaneous center of rotation
P Center of motion
$P_1$ Intersecting point
$P_2$ Intersecting point
P3 Intersecting point
P4 Center of motion
P5 Center of motion
R Radius of the instantaneous center of rotation
R' Radius component
R" Radius
$\alpha$ Angle of inclination
$\beta$ Averaged angle of lock
$\beta'$ Angle of lock
$\beta''$ Angle of lock
$\gamma$ Direction of travel angle δ Difference in angle
λ Angle of inclination

What is claimed is:

1. A device comprising an attachment for harvesting stalk-like crops, the attachment being adapted for mounting on a front side of a carrier vehicle, and the attachment having a plurality of working tools and at least one stalk-guiding element mounted at least partly upstream from the working tools, wherein the at least one stalk-guiding element executes a rotational movement about a center of motion of an upright pivot axis as a function of the location or position of at least one of the attachment and the carrier vehicle while the attachment is mounted to the front side of the carrier vehicle;

wherein at least one angle of steering lock of steering wheels of the carrier vehicle is detected and measured by an angle of rotation sensor and supplied as an input signal to an input of a microprocessor, whereby at least one output signal is generated to activate an actuating drive to produce an angle of inclination $\alpha$ about a first center of motion.

2. The device as claimed in claim 1, wherein the entire attachment executes a relative rotation with respect to a longitudinal center plane by the angle of inclination $\alpha$ about the first center of motion.

3. The device as claimed in claim 2, wherein the relative rotation contains at least two rotation operations such that the attachment executes a first rotation by the angle of inclination $\alpha$ and at least one stalk-guiding element of the attachment executes a second rotation by an angle of inclination $\gamma$.

4. The device as claimed in claim 1, wherein at least one of two outer sections of the attachment executes a rotation relative to a longitudinal center plane by the angle of inclination $\alpha$ about a second center of motion that is the same as or different from the first center of motion.

5. The device as claimed in claim 3, wherein at least one angle of inclination $\alpha$ and $\gamma$ is controlled as a function of an amount of an instantaneous turning radius (R) during cornering of the carrier vehicle.

6. The device as claimed in claim 3, wherein at least one angle of inclination $\alpha$ and $\gamma$ is controlled as a function of an amount of the angle of steering lock of the steering wheels on the carrier vehicle.

7. The device as claimed in claim 1, wherein the actuating drive comprises at least one hydraulic cylinder.

8. The device as claimed in claim 3, wherein the at least one angle of inclination $\alpha$ and $\gamma$ is predetermined by means of one of a presettable manual control and an automatic control operating mode.

9. The device as claimed in claim 3, wherein the at least one angle of inclination $\alpha$ and $\gamma$ is controlled as part of an automatic steering control of the carrier vehicle.

10. The device as claimed in claim 3, wherein the at least one angle of inclination $\alpha$ and $\gamma$ is controlled via a manually actuable actuating element that forms part of a control device of the carrier vehicle.

11. The device as claimed in claim 3, wherein at least portions of control components for controlling the at least one angle of inclination $\alpha$ and $\gamma$ are situated onboard the carrier vehicle.

12. The device as claimed in claim 10, wherein at least portions of control components for controlling the at least one angle of inclination $\alpha$ and $\gamma$ are situated on the attachment.

13. The device as claimed in claim 10, wherein the control device comprises a microprocessor.

14. The device as claimed in claim 10, wherein the control device comprises a databus.

15. The device as claimed in claim 10, wherein the control device comprises a job computer located on the attachment side.

16. The device as claimed in claim 15, wherein the control device and job computer communicate with each other by means of a databus.

17. The device as claimed in claim 10, wherein the control device comprises a load-sensing hydraulic pump.

18. The device as claimed in claim 17, wherein the hydraulic pump is controlled by one of a pressure means and a conveying flow means.

19. The device as claimed in claim 10, wherein the control device comprises proportionally controlled control valves.

* * * * *